United States Patent [19]

Folling et al.

[11] Patent Number: 4,544,319
[45] Date of Patent: Oct. 1, 1985

[54] CARGO TRANSFER SYSTEM

[75] Inventors: Norman D. Folling, Monroe; Donald B. Terrana, Redmond, both of Wash.

[73] Assignee: The Boeing Company, Seattle, Wash.

[21] Appl. No.: 534,593

[22] Filed: Sep. 22, 1983

[51] Int. Cl.[4] .............................................. B64C 1/22
[52] U.S. Cl. .................................. 414/505; 198/457; 198/598; 244/137 R; 414/353; 414/532
[58] Field of Search ............... 414/340, 343, 352, 353, 414/398, 502–505, 532–535; 198/457, 597, 598; 244/137 R

[56] References Cited

U.S. PATENT DOCUMENTS

| | | |
|---|---|---|
| 1,472,679 | 10/1923 | Roddy . |
| 2,000,292 | 5/1935 | Miller .................................. 198/81 |
| 2,021,251 | 11/1935 | Brykczynski et al. ................. 107/7 |
| 2,139,877 | 12/1938 | Brandt .................................. 198/79 |
| 2,732,067 | 1/1956 | Cunningham et al. ............. 209/121 |
| 2,830,693 | 4/1958 | Schlossmacher ................... 198/78 |
| 3,100,039 | 8/1963 | Oderman et al. ................... 198/33 |
| 3,104,004 | 9/1963 | Poel et al. ............................ 198/20 |
| 3,221,754 | 12/1965 | Robson et al. ....................... 134/68 |
| 3,321,063 | 5/1967 | Blume ................................... 198/38 |
| 3,356,236 | 12/1967 | Shaw et al. ...................... 244/137 R |
| 3,451,526 | 6/1969 | Fernandez ............................. 198/75 |
| 3,469,887 | 9/1969 | Nakahara et al. . |
| 3,680,677 | 8/1972 | Branch et al. ........................ 198/20 |
| 3,690,435 | 9/1972 | King et al. ....................... 198/592 X |
| 3,756,374 | 9/1973 | Burt et al. ............................. 198/78 |
| 3,756,544 | 9/1973 | Bader ................................. 244/137 |
| 3,822,777 | 7/1974 | Jepsen .................................. 198/31 |
| 3,861,541 | 1/1975 | Taft et al. . |
| 4,174,774 | 11/1979 | Bourgeois . |

OTHER PUBLICATIONS

"Handling Air Freight in the 1980s, Meeting the Challenge", Oct., 1981.

Primary Examiner—Robert G. Sheridan
Attorney, Agent, or Firm—Christensen, O'Connor, Johnson & Kindness

[57] ABSTRACT

A cargo transfer system (10) for loading a unit-load (26) into and unloading the unit-load from the lower hold (12) of an aircraft fuselage (14) and for transferring the unit-load into and out of storage position along the fuselage, includes a tiltable platform (22) constructed with a lateral belt drive in the form of conveyors (32) to receive the unit-load from ground equipment. After receipt of the unit-load (26) the platform (22) is returned to a horizontal position thereby causing the unit-load to be removed from the lateral belt conveyors (32) and instead supported by a longitudinal belt drive in the form of belt conveyors (34) and (35) mounted on the lower deck (24) of the aircraft. Transfer platform (22) also includes a longitudinally disposed idler roller subassembly (36) adapted to raise and lower with a tilting of the platform so that when the platform is tilted downwardly to receive or discharge the unit-load, the roller subassembly is disposed below lateral belt conveyors (32) and when the platform is returned to horizontal position, the roller subassembly rises upwardly relative to platform (22) to assist longitudinal belt conveyors (34) and (35) in supporting and transferring the unit-load.

23 Claims, 9 Drawing Figures

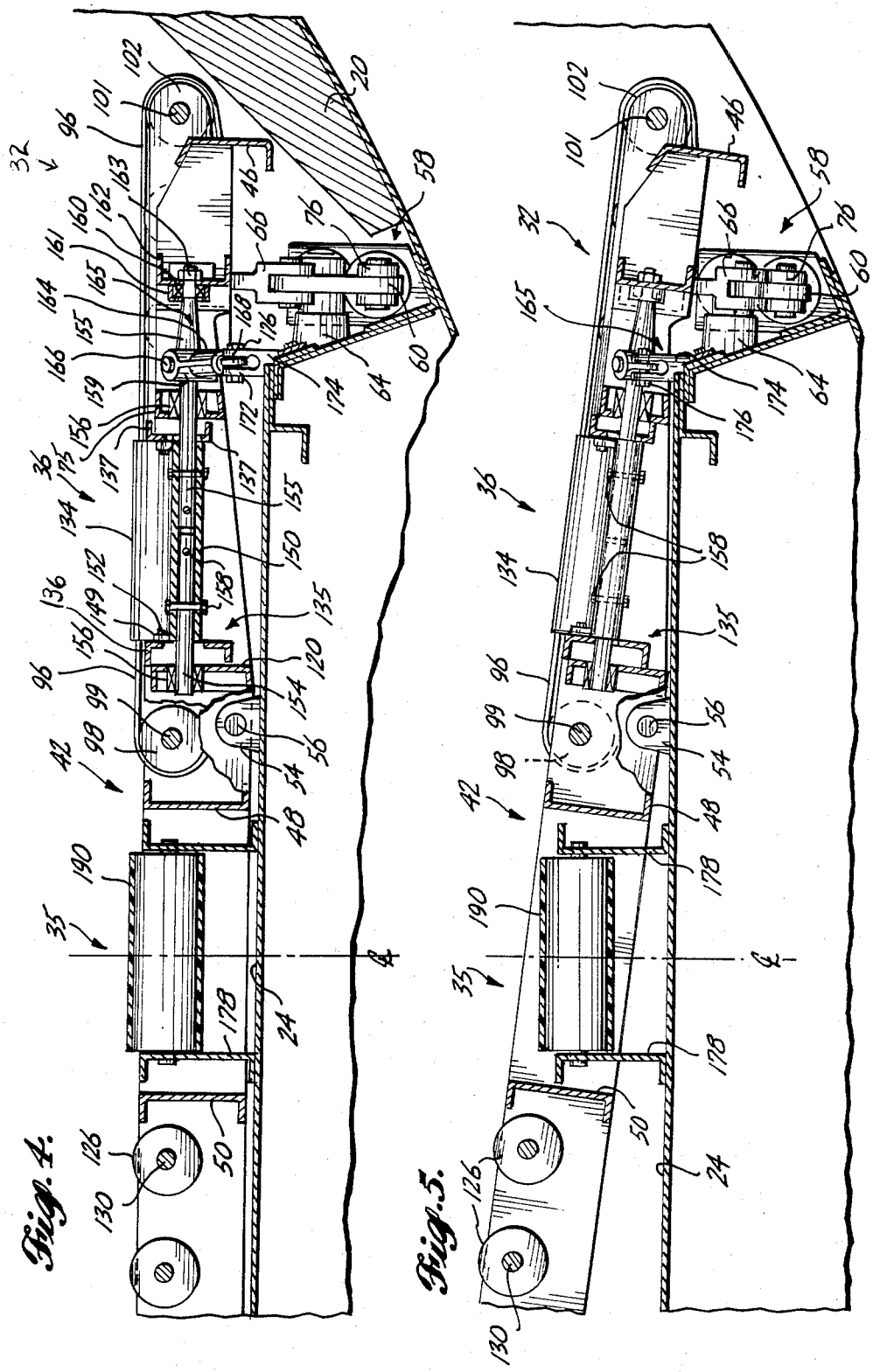

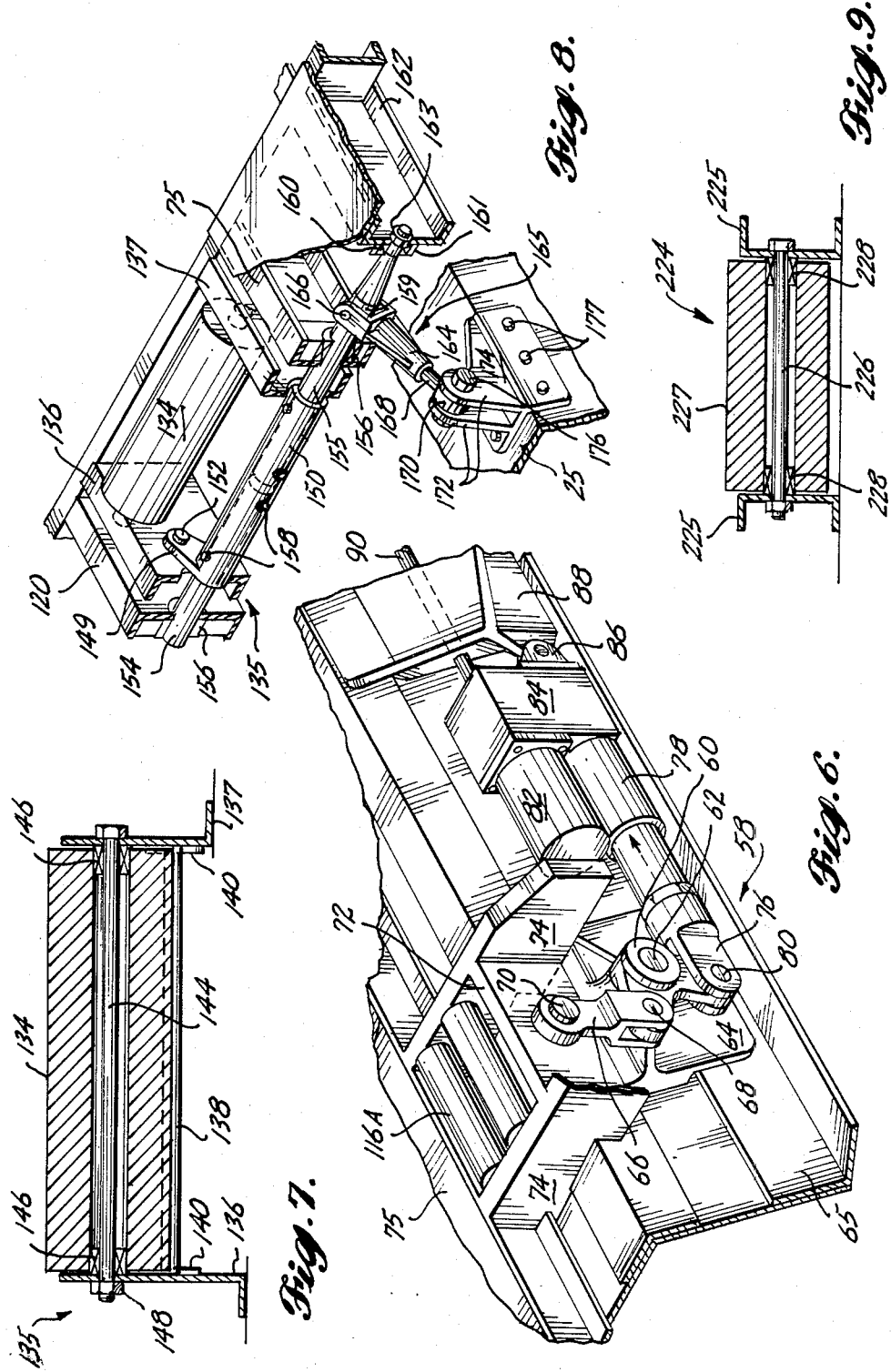

CARGO TRANSFER SYSTEM

TECHNICAL FIELD

The present invention relates to cargo transfer systems, and more particularly to a system for loading into and unloading out of the lower hold of aircraft unit-loads of cargo in various configurations, for example, in the form of large rigid or semi-rigid containers or in the form of individual packages held together by one or more means such as a pallet, slipsheet, strapping, interlocking, glue, shrink wrap, stretch wrap, or net wrap to make the packages suitable for transporting, stacking and storing as a single, large unit-load.

BACKGROUND OF THE INVENTION

Except for the carrying of passenger baggage, the capacity of the lower cargo hold of an aircraft is often poorly utilized. This is especially true for the standard-width body, short to medium range airplanes. These planes typically do not have automated cargo-handling systems and the airport short turnaround time required for these planes is frequently insufficient to permit any significant amount of nonbaggage cargo to be manually loaded and unloaded.

In larger, wide-bodied planes, cargo is shipped as a unit-load commonly in standardized, rigid containers that are loaded into the lower cargo hold with power operated equipment. In one typical arrangement, the floor of the hold is equipped with powered and unpowered rollers or balls that bear against the underside of the containers to move them horizontally into, out of, and along the cargo hold. Similar containers have not been widely utilized in standard-width body aircraft. One reason for this is that such containers would have to be reduced in size to fit within the smaller cargo holds of these planes and, thus, the containers would have a high tare weight in comparison to the cargo weight.

In another type of aircraft cargo system, longitudinal rows of rollers support the container for movement along the fuselage. An elongate powered dolly rides in a narrow track extending along the center of the cargo hold floor. A relatively small bearing plate is carried on the end of the dolly. The bearing plate is raised to bear against the underside of the container and lowered by inflating and deflating an underlying airbag. An example of this type of cargo system is disclosed by U.S. Pat. No. 3,756,544.

In a further aircraft cargo system, the rigid cargo containers are moved longitudinally through the fuselage by a powered carriage mechanism. The carriage mechanism includes a pair of lifting arms that slide under the container to support the container above the floor as the container is being moved. An example of this type of cargo system is disclosed by U.S. Pat. No. 3,861,841.

The rigid cargo containers that are in current use are typically owned by the airlines and packed and unpacked by airline personnel. Airfreight rates probably could be reduced if containers were owned, packed, and unpacked by the shipper. As a consequence, low-cost, lightweight shipping containers are now being developed for ownership by the shipper. These containers could be constructed from cardboard, low-density plastic, and would be of sufficient structural integrity to be reused only a limited number of times. This type of container construction would be especially advantageous for smaller containers employed in conjunction with standard-width body aircraft; however, this type of container could not be used until systems are developed for rapidly loading and unloading the containers into and out of aircraft. Because of the relatively low structural integrity of these types of containers, the powered roller or powered ball systems currently in service for transferring the rigid containers of the wider bodied aircraft could not be employed. The same is true for the cargo transfer system disclosed in the above-noted U.S. Pat. No. 3,756,544.

Another consideration in developing a powered transfer system for loading and unloading unit-loads from standard-width body aircraft is that the standard lower cargo hold openings of such aircraft typically do not extend the full height of the hold. As a consequence, if the unit-load enters and exits the cargo hold on a horizontal transfer device as in the systems disclosed in the above-mentioned U.S. Pat. Nos. 3,756,544 and 3,861,541, the height of the load would be limited by the height of the hold opening, and thus, a significant volume of the hold would not be utilized.

Accordingly, it is a principal object of the present invention to provide a powered system for loading and unloading unit-loads of various configurations (for instance, in the form of a lightweight, low structural integrity container or in the form of a number of small packages bound together on a standard commercial pallet or slipsheet) into and out of the lower cargo hold of a standard-width body aircraft rapidly and with a minimum amount of manpower.

It is a particular object of the present invention to provide powered transfer system for loading onto and unloading from aircraft, unit-loads having a height larger than the vertical height of the cargo hold opening.

It is another particular object of the present invention to provide a powered system for loading and unloading lightweight, low structural integrity containers and other unit-loads on existing standard-width body aircraft without requiring any major structural alterations to the aircraft.

To achieve these objectives, it is desirable to provide a cargo transfer system that is integrated into the aircraft and capable of receiving low structural integrity unit-loads through the standard cargo hold opening in the side of the fuselage and then shifting the direction of travel of the unit-loads to move along the length of the cargo hold. In the past, several types of conveyor transfer devices have been developed for changing the direction of movement of items being transported on the conveyors. For instance, U.S. Pat. Nos. 3,104,004, 3,221,754 and 3,321,063 disclose devices utilizing rather small lugs carried by endless chains arranged transversely to the conveyor on which the container or object is being transported. The lugs push against the lower edge of a container or other object being transported to force the container sideways off of the conveyor and onto another conveyor. The container or other object must have sufficient structural integrity to withstand the pushing force of the lugs, which probably would not be the case for cardboard or a similar limited-duty container with which the present invention is contemplated for use.

Another known manner of shifting the direction of travel of an object moving along a conveyor system is by rotating the conveyor about a vertical axis, thereby changing the direction of operation of the conveyor itself. Examples of such systems are disclosed by U.S. Pat. Nos. 2,021,251; 2,732,067; and 3,100,039.

In a further type of conveyor system, articles are transferred from a first conveyor to a perpendicularly arranged second conveyor by a plunger that pushes against the side of the object moving along the first conveyor, thereby sliding the object onto the second conveyor. It will be appreciated that for heavy objects, such as aircraft freight containers or other unit-load packaging, the container or packaging must have sufficient structural integrity to withstand the force of the plunger and the resisting frictional force acting between the first conveyor and the bottom of the container or packaging. An example of this type of conveyor system is disclosed by U.S. Pat. No. 3,469,887.

In an additional known type of conveyor system, articles are routed in a particular direction by a transfer station composed of one or more belts disposed transversely to a plurality of elongate rollers to move articles in a direction perpendicular to the direction in which the rollers are adapted to move articles. The rollers and the belts are vertically movable relative to each other so that either the rollers or belts function as a moving surface for transferring articles arriving at the transfer station, depending on the desired direction of travel. Examples of this type of conveyor system are disclosed in U.S. Pat. Nos. 3,680,677 and 3,756,374. A similar conveyor mechanism is disclosed in U.S. Pat. No. 1,472,697 wherein the rollers and conveyor are disposed at separate fixed levels of a frame structure. The entire frame structure is vertically movable to position either the belt or the rollers in coplanar relationship with associated conveyors that carry articles to and away from the moving frame structure in different directions, depending on the elevation of the frame structure.

In another type of conveyor system, the transfer station is located at the intersection of three conveyor belts, with two of the belts in longitudinal alignment on opposite sides of the transfer station and the third belt disposed perpendicular to the first two belts. The transfer station itself includes an endless belt in line with the first two belts. Articles moving along the first belt can be transferred to the aligned second belt by the transfer station belt. To change the direction of movement of the article from the first belt to the transverse, third belt, the transfer station belt is lowered and then air discharged up through exhaust holes formed in the surface of the transfer station, in theory to lift the article above the top surface of the transfer station. The article is then pushed transversely onto the third belt by a plunger positioned on the side of the transfer station opposite the third belt. An example of this type of conveyor system is disclosed in U.S. Pat. No. 3,822,777.

SUMMARY OF THE INVENTION

The foregoing and other objects are achieved in accordance with the present invention by providing a tiltable conveying plane constructed in the form of a loading and unloading platform positioned in an aircraft cargo hold adjacent an access opening to the hold. The side of the plane (hereinafter referred to as "platform" or "transfer platform") adjacent the hold is tiltable downwardly to receive a cargo container or other type of a unit-load from inclined ground support equipment and move the container into the cargo compartment on laterally disposed belt drive. Additional laterally disposed idler rollers are mounted on the platform to assist in supporting the underside of the container or unit-load packaging during lateral movement on the platform. After the unit-load has been fully placed on the platform, the platform is pivoted into level or horizontal position, thereby shifting the unit-load from the lateral belt drive and idler rollers onto a longitudinal belt drive for movement longitudinally forwardly or rearwardly into storage position in the cargo hold. The unit-load is unloaded by reversing the above-described procedure.

In one embodiment of the present invention, the lateral belt drive includes a pair of parallel, belt conveyors that define a first load-carrying surface for movement of unit-loads laterally onto and off of the transfer platform. Preferably the lateral belt conveyors are positioned on the transfer platform at locations adjacent the cargo hold opening to engage the leading portion of the unit-load as it enters the cargo hold. Also, preferably, the lateral idler rollers are positioned on the portion of the transfer platform opposite the cargo hold opening to support the unit-load as it moves beyond the lateral conveyors.

In another aspect of the present invention, the longitudinal belt drive is composed of a pair of parallel belt conveyors that are mounted on the deck of the fuselage transversely to the lateral belt conveyors. The longitudinal belt conveyors define a second load-carrying surface that is disposed beneath the first load-carrying surface defined by the lateral belt conveyors when the transfer platform is disposed in tilted position. As a consequence, the longitudinal belt conveyors do not interfere with the movement of a container or other type of unit-load laterally onto and off of the transfer platform. However, when the transfer platform is pivoted into its horizontal or level position, the load-carrying surface defined by the longitudinal belt conveyors is disposed above the load-carrying surface defined by the lateral belt conveyors, thereby transferring the unit-load from the lateral belt conveyors onto the longitudinal belt conveyors. As a consequence, when the unit-load is transported forwardly or rearwardly by the longitudinal belt conveyors to move the unit-load into or out of storage position, the lateral belt conveyors do not interfere with the underside of the unit-load packaging.

In a further aspect of the present invention, a longitudinal, idler roller assembly is mounted on the transfer platform to define an auxiliary load-carrying surface to assist in supporting the underside of the unit-load packaging during longitudinal movement on the transfer platform. In a preferred embodiment of the present invention, the longitudinal idler roller assembly is adapted to automatically rise upwardly above the first load-carrying surface defined by the lateral belt drive when the transfer platform is in horizontal position thereby to position the roller assembly in substantially coplanar relationship with the second load-carrying surface defined by the longitudinal belt drive. The roller assembly is also adapted to automatically retract downwardly below the first load-carrying surface when the transfer platform is in tilted position to avoid interfering with the underside of the unit-load packaging during lateral movement onto and off of the transfer platform. One end of the arms of a pair of crank members are pinned to the idler roller assembly while the opposite ends of the arms are rotatably journaled on a frame portion of the transfer platform so that when the crank members are pivoted, the roller assembly and the crank members cooperatively define a four-bar linkage arrangement. The crank members are automatically rotated in response to the orientation or tilt of the platform through the use of a telescoping yoke assembly that is pivotally pinned at opposite ends to the crank members and to the cargo hold deck so that the yoke assembly and thus also the crank members rotate as the transfer platform pivots relative to the cargo hold deck.

In an additional aspect of the present invention, a series of forward belt drives are positioned forwardly along the cargo hold deck from the transfer platform and a series of rearward belt drives are positioned rearwardly along the cargo hold deck from the transfer platform. The forward and rearward belt drive assemblies are disposed in substantially coplanar relationship with the load-carrying surface defined by the longitudinal belt drive to receive unit-loads from the transfer platform and move them forwardly or rearwardly through the cargo hold. Preferably, each forward and rearward belt drive is composed of a pair of endless belt-type conveyors positioned in laterally spaced-apart, parallel relationship to each other. The belt conveyors cooperatively define a large load-bearing surface to support generally uniformly the underside of the unit-load. In addition to the belt drives, a row of idler rollers is positioned outwardly of each endless belt type conveyor to extend along the entire lengths of the forward and rearward belt drives to underlie and assist in supporting laterally outward portions of the unit-load. As a consequence, a container or other type of unit-load packaging can be constructed from lightweight, low strength materials. Ideally each forward and rearward belt drive is constructed in a length corresponding to the longitudinal dimension of the unit-load so that each unit-load is supported by a single belt drive together with the two rows of idler rollers.

BRIEF DESCRIPTION OF THE DRAWINGS

The details of a typical embodiment of the present invention will be described in connection with the accompanying drawings, in which:

FIG. 4 is an enlarged, fragmentary, cross-sectional view of the present invention shown in FIG. 3 taken substantially along line 4—4 thereof, specifically illustrating the transfer platform disposed in horizontal position;

FIG. 5 is a view similar to FIG. 4, but with the transfer platform disposed in tilted position;

FIG. 6 is an enlarged, fragmentary, isometric view of a portion of the transfer platform illustrated in FIG. 3 specifically showing the mechanism for tilting the platform;

FIG. 7 is an enlarged, fragmentary, cross-sectional view of the present invention shown in FIG. 3, taken substantially along lines 7—7 thereof;

FIG. 8 is an enlarged, fragmentary, isometric view of a portion of the transfer platform depicted in FIG. 3, specifically illustrating the mechanism for raising and lowering the longitudinal idler roller subassembly; and FIG. 9 is an enlarged, fragmentary cross-sectional view of the present invention shown in FIG. 3, taken substantially along lines 9—9 thereof.

DETAILED DESCRIPTION

Figure 1:
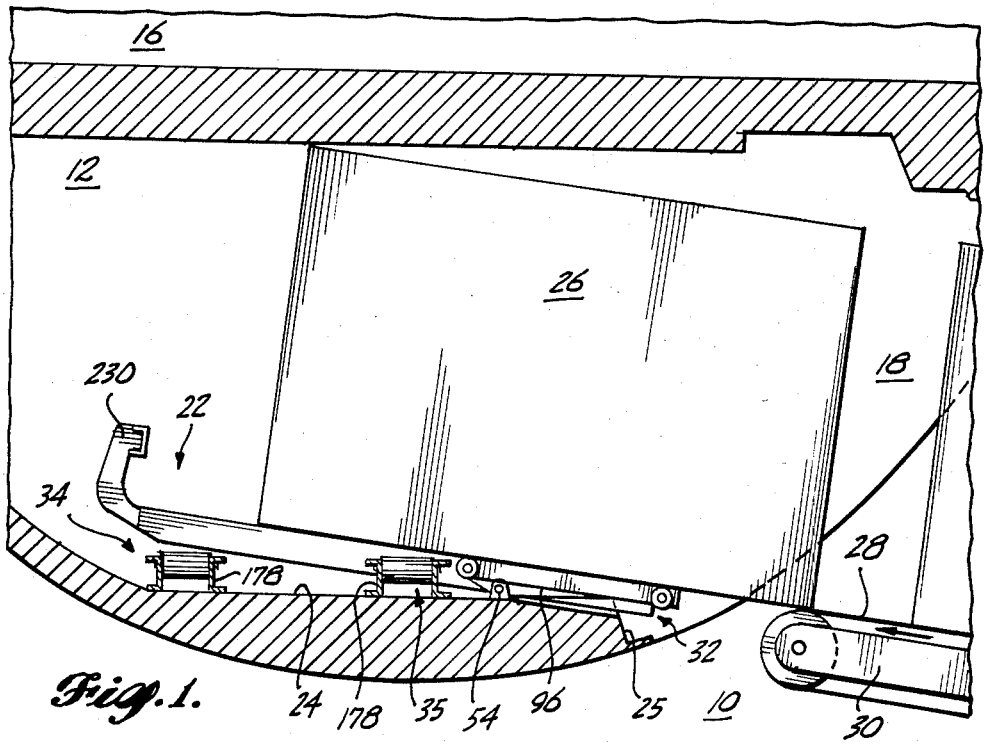
FIG. 1 is a schematic, fragmentary cross-sectional view of an aircraft fuselage illustrating the present invention installed in the lower cargo hold of the aircraft with a transfer platform shown in maximum tilted position.
Figure 2:
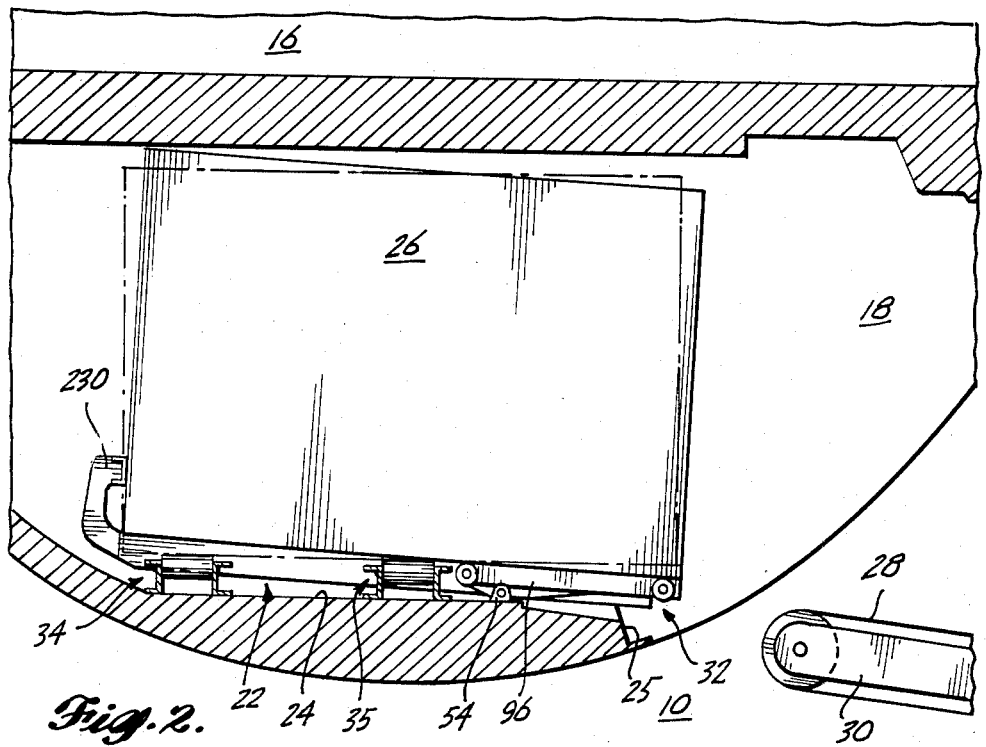
FIG. 2 is a view similar to FIG. 1, however, showing the conveying plane constructed in the form of a transfer platform that is disposed in intermediate tilted position and in horizontal position (shown in phantom line)

FIGS. 1 and 2 schematically illustrate a cargo transfer system 10 constructed according to the best mode of the present invention currently known to applicants and shown installed in the lower cargo compartment or hold 12 of an aircraft fuselage 14. As is typical in aircraft construction, cargo hold 12 is disposed below a passenger compartment 16. A side opening 18, shown at the right-hand side of fuselage 14 in FIGS. 1 and 2, provides access to cargo hold 12 when door 20, FIG. 4, is open.

Figure 3:
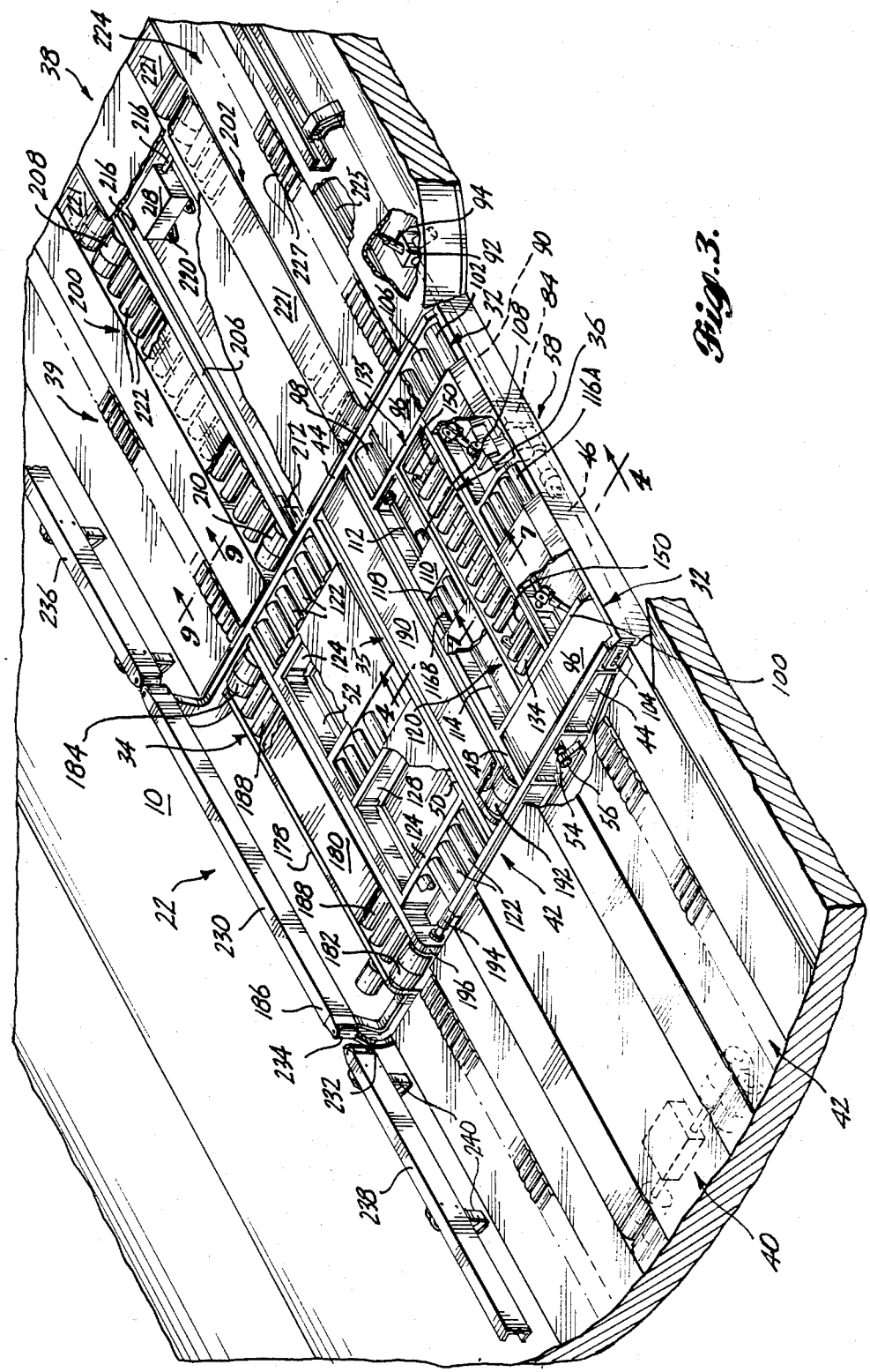
FIG. 3 is a partially schematic, isometric view of the present invention as viewed from above and the left side of FIGS. 1 and 2 with portions broken away for clarity.

In basic construction, cargo transfer system 10 includes a tiltable conveying plane configured in the form of a transfer platform 22 mounted on the lower deck 24 of cargo hold 12 adjacent compartment opening 18. Transfer platform 22 is tiltable downwardly toward the sill 25 of compartment opening 18 to receive a unit-load 26 illustrated as being in the form of a rectangular container, from the correspondingly tilted belt conveyor 28 of a ground loader 30. Referring additionally to FIG. 3, a lateral belt drive in the form of belt conveyors 32 is mounted on platform 22 to move unit-load 26 laterally into cargo hold 12. Platform 22 is then returned to horizontal position, thereby shifting unit-load 26 from belt conveyors 32 to a longitudinal belt drive in the form of belt conveyors 34 and 35 mounted on lower deck 24 and an auxiliary conveyor in the form of a longitudinally disposed idler roller subassembly 36 mounted on the transfer platform. Belt conveyors 34 and 35 are actuated to move unit-load 26 longitudinally forwardly onto a forward belt drive 38 and forward idler roller assemblies 39 or rearwardly onto rearward belt drive 40 and rearward idler roller assemblies 41 into storage position in the cargo compartment. Unit-load 26 is unloaded by reversing the above-described loading procedure.

FIGS. 1 and 2 illustrate one particular contemplated configuration of unit-load 26 as being in the form of a rectangularly shaped container that occupies substantially the full height of cargo hold 12. To make maximum use of the capacity of the cargo compartment it is important that containers and other types of unit-loads 26 extend as high as possible. In one contemplated form of container to be employed with the present invention, the container is constructed from inexpensive, lightweight, low structural integrity material, such as cardboard or low-density plastic, to minimize the tare weight of the container and also to enable individual shippers to purchase the container at a reasonable cost. As a consequence, it is contemplated that the container has sufficient structural integrity to be used once or perhaps only a few times. Thus, cargo transfer system 10 must be capable of efficiently and safely handling such containers without damage to the containers or their contents.

In addition to being in the form of a lightweight, low structural integrity container, it is contemplated that unit-load 26 may be of numerous other configurations. By way of nonlimiting example, the unit-load 26 can be in the form of individual packages held together by one or more means such as a pallet, slipsheet, strapping, glue, shrink wrap, stretch wrap or net wrap to make the packages suitable for transporting, stacking and storage as a single unit-load.

Next, referring specifically to FIGS. 3, 4, and 5, transfer platform 22 is composed of a generally rectangularly shaped, low-profile frame 42 pivotally mounted on lower deck 24. The frame is composed of a pair of elongate, spaced-apart, parallel lateral beams 44 formed generally in the shape of channel members and extending substantially across the full width of lower deck 24. Beams 44 are interconnected by a plurality of longitudinally disposed crossbeams, including side beam 46 extending along the side of frame 42 adjacent opening 18, a pair of parallel, spaced-spart intermediate beams 48 and 50, and side beam 52 extending along the side of the frame opposite opening 18. Preferably, beams 46, 48, 50, and 52 are in the form of channel members, thereby providing a relatively high section modulus in proportion to the weight of the beams.

Transfer platform 22 is pivotally mounted on lower deck 24 by a pair of mounting brackets 54 securely affixed thereto. Each mounting bracket 54 is constructed with a pair of parallel, spaced-apart, upwardly extending ears that receive a beam 44 therebetween. A crosspin 56 extends through a pair of aligned openings formed in the mounting bracket ears and through a close-fitting opening formed in beam 44 to serve as a pivot axis for the transfer platform. Rather than being located along the transverse center of transfer platform 22, preferably crosspins 56 are offset therefrom toward cargo hold opening 18. As a consequence, when unit-load 26 is placed on the transfer platform 22, the weight of the unit-load tends to pivot the platform downwardly into horizontal position, as shown in FIG. 2. Also, by placing crosspins 56 at this location, when the platform is in tilted orientation, the side of the platform adjacent opening 18 does not swing downwardly toward lower deck 24 as far as it would if crosspins 56 were located at the lateral center of the platform. As a consequence, less modification must be made to the lower deck 24 and sill 25 of fuselage 14 than would be needed if the forward edge of the platform swung downwardly to a lower elevation than shown in FIGS. 1 and 5.

Additionally referring to FIG. 6, transfer platform 22 is pivoted about crosspins 56 by an actuating assembly 58 in part composed of a bell crank 60 pivotally mounted on a stub shaft 62 extending horizontally outwardly from a mounting bracket 64 secured to sill 25 of cargo compartment opening 18. Bell crank 60 includes a diagonally upwardly extending arm that is pivotally secured to the lower clevis portion of an upright linkage member 66 by a crosspin 68 extending through aligned openings formed in the clevis portion and through a close fitting clearance opening formed in the bell crank arm. The upper end of linkage member 66 is pivotally engaged over a stub shaft 70 extending horizontally outwardly from the central portion of the side face of an attachment plate 72 extending between a pair of elongate, transverse beam members 74 spanning side beam 46 and a longitudinal crossbeam 75. Bell crank 60 also includes a downwardly extending arm that is pinned to a clevis 76 attached to the forward end of a linear actuator 78 by a crosspin 80 extending through aligned openings in the clevis and through a clearance opening in the bell crank arm. In a preferred embodiment of the present invention linear actuator 78 is composed of a self-locking screw mechanism powered by an electric motor 82 through a gear speed reducer 84. A clevis 86 extends outwardly from the side of speed reducer 84 opposite linear actuator 28 in longitudinal alignment with clevis 76 to pivotally attach the speed reducer to a mounting bracket 88 secured to sill 25 of cargo compartment opening 18 in a manner similar to the attachment of bracket 64 to the sill. It will be appreciated that clevises 76 and 86 permit the free end of linear actuator 78 to move up and down with the rotation of bell crank 60 without causing the relatively sliding components of the actuator to bind.

In case of power failure, actuating assembly 58 includes an elongate driveshaft 90, shown in dotted line in FIG. 3, extending horizontally outwardly from speed reducer 84 in the direction opposite electric motor 82. One end of driveshaft 90 is interconnected in torque-transmitting relationship with the gear train, not shown, of speed reducer 84, and the opposite end of the driveshaft is interconnected with a right-angle drive mechanism 92 powered by the rotation of a flexible driveshaft 94 extending upwardly from the drive mechanism along the arcuate contour of the fuselage. A hand crank, ratchet mechanism (not shown) or other means may be permanently or detachably connected to the upper end of driveshaft 94 to manually operate linear actuator 78 if electrical power to drive motor 82 is not available.

Next, referring specifically to FIGS. 3, 4, and 5, a pair of lateral belt conveyors 32 are mounted on the side portion of transfer platform 22 to extend along the inside faces of corresponding lateral beams 44. Each belt conveyor 32 is composed of an endless belt 96 extending between a drive pulley 98 and a tensioning pulley 102. Drive pulley 98 is antifrictionally mounted on a support shaft 99 spanning lateral beam 44 and a parallel, corresponding beam 100. Tensioning pulley 102 is antifrictionally mounted on a support shaft 101 mounted on tensioning devices 104 secured to the outside faces of beams 44 and 100. Tensioning devices 104 bias the tensioning pulley away from its drive pulley 98 to maintain a selective tension load on endless belt 96, in a manner well known in the art. Beams 100, as best shown in FIG. 3, extend between longitudinal beams 46 and beam 48. Drive pulley 98 and tensioning pulley 102 are centrally crowned to maintain endless belt 96 centered on these pulleys.

At locations between drive and tensioning pulleys 98 and 102, the upper flight of each endless belt 96 is supported by a plurality of spaced-apart, cylindrical idler rollers 106 antifrictionally mounted on support shafts, not shown, spanning between lateral beams 44 and a corresponding beam 100. Preferably, idler rollers 106 are of a diameter substantially smaller than the minimum diameter of pulleys 96 and 102 and, thus, these rollers avoid contact with the lower flight of belt 96. As best shown in FIGS. 4 and 5, pulleys 98 and 102 and idler rollers 106 support the upper flight of belts 96 at an elevation so that the upper or load-carrying surfaces of the belts are disposed slightly above, i.e., approximately $\frac{1}{4}$ inch, a plane defined by the upper edges of lateral beams 44 and beams 100. Preferably, the outer surfaces of belts 96 are composed of a suitable material that is not only durable, but also exhibits a sufficient coefficient of friction with the underside of unit-load 26 to avoid slipping relative to unit-load 26 when moving the load laterally on transfer platform 22 when in tilted orientation.

As shown in FIG. 3, drive pulleys 98 are powered by an electric motor 108 connected to a speed reducer 110 mounted on the side of intermediate beam 48 facing the cargo compartment opening. Driveshafts 112 and 114 extend outwardly from opposite sides of speed reducer 110 to drivingly engage drive pulleys 98.

Transfer platform 22 also includes auxiliary conveyors in the form of two sets of lateral idler rollers 116A and 116B disposed parallel to and generally centrally between belt conveyors 32 and positioned in longitudinal alignment with each other on opposite sides of longitudinal idler roller assembly 36. Idler rollers 116A are closely receivable between and mounted on beam members 74 (FIG. 6) by mounting shafts and appropriate antifriction means, not shown, in a manner well known in the art so that the upper surfaces of the rollers are coplanar with the load-carrying surface defined by endless belts 96 of belt conveyors 32. The second set of idler rollers 116B is likewise closely receivable between and mounted on a pair of spaced, parallel, rather short mounting beams 118 by antifriction means and support shafts, not shown, spanning beams 118. At one end beams 118 are secured to a longitudinal crossbeam 120 spanning beams 100 in spaced, parallel relationship to crossbeam 75. The opposite ends of mounting beams 118 are secured to the adjacent side of intermediate beam 48. For high strength relative to their weight, preferably mounting beams 118 and crossbeam 120 are formed in a channel-shaped cross section similar to the cross-sectional shape of intermediate beam 48. Also, ideally the upper edges of beams 118 and 120 are coplanar with all of the other beam members from which frame 42 is constructed, and the upper surfaces of rollers 116B are coplanar with the load-carrying surface defined by endless belts 96.

When positioned on transfer platform 22, unit-load 26 is also supported by two sets of laterally oriented, rear idler rollers 122 disposed between longitudinal belt conveyors 34 and 35 and in alignment with corresponding lateral belt conveyors 32. Idler rollers 122 are positioned closely between a corresponding lateral beam 44 and a crossbeam 124 disposed in spaced-apart, parallel relationship to the lateral beam 44 and extending between intermediate beam 50 and side beam 52 of platform frame 42. The idler rollers are mounted on the lateral and crossbeams by mounting shafts and appropriate antifriction bearings, not shown. Consistent with the other components of platform frame 42, preferably crossbeams 124 are also formed from channel members. Also, ideally, idler rollers 122 extend a short distance, for instance, approximately ¼ inch above the platform frame so that the upper surfaces of the rollers are coplanar with the load-carrying surface defined by endless belts 96 to serve as an auxiliary load-carrying surface to help support the underside of unit-load 26 for movement along transfer platform 22.

A third set of lateral idler rollers 126 is disposed between the two roller sets 122 and in longitudinal alignment with idler rollers 116A and 116B. Rollers 126 are mounted on a pair of parallel, spaced-apart beams 128 disposed in longitudinal alignment with mounting beams 118 of idler rollers 116B by use of mounting shafts and appropriate antifriction bearings, not shown. As with idler rollers 122, ideally rollers 126 are positioned so that their upper surfaces are coplanar with the load-carrying surface defined by endless belts 96 to serve as an auxiliary load-carrying surface to assist in supporting unit-load 26.

Referring to FIGS. 3, 4, 5, 7 and 8, transfer platform 22 also includes an auxiliary conveyor in the form of a longitudinal idler roller assembly 36 positioned between and oriented perpendicularly to lateral belt conveyors 32. Longitudinal roller assembly 36 is composed of a plurality of individual rollers 134 mounted on a subframe 135 composed of elongate side members 136 and 137 maintained in parallel, spaced-apart relationship to each other by a plurality of spacer tubes 138 (FIG. 7) having flanges 140 attached to their ends. Flanges 140 are in turn secured to the web portions of side members 136 and 137 by bolts, weldments or other appropriate means. As shown best in FIG. 5, side member 137 is shallower in depth in comparison to side member 136 to avoid interfering with lower deck 24 when the transfer platform is disposed in tilted position. Again referring specifically to FIG. 7, rollers 134 are mounted on side members 136 and 137 by shafts in the form of elongate bolts 144 extending through clearance openings formed in the side members and through the center of antifriction bearings 146 pressed into the hollow end portions of the rollers to threadably engage with retaining hardware, for instance, in the form of nut 148.

As best shown in FIGS. 4, 5 and 8, side members 136 and 137 are closely receivable between crossbeams 75 and 120 of platform frame 42 and are pivotally attached to the transverse arms 149 of a pair of spaced-apart crank members 150 extending laterally between the side members by pins 152. Each crank member 150 is in turn antirotationally secured to two separate torque shafts 154 and 155 extending through clearance holes formed in respective side members 136 and 137 and into opposite ends of the hollow of crank member 150 to approximately the center of the crank member. The torque shafts 154 and 155 are journaled within bearings 156 mounted on respective crossbeams 75 and 120. Crosspins 158 extend through aligned, diametrically opposite holes provided in crank member 150 and corresponding aligned cross-holes formed in torque shafts 154 and 155, to securely interconnect the crank member with the torque shafts. It will be appreciated that by utilizing two torque shafts 154 and 155 to support each crank member 150, the torque shafts and the crank member can be conveniently disassembled without removing subframe 135 from the platform frame 42. As shown most clearly in FIGS. 4, 5 and 8, torque shaft 155 extends outwardly beyond bearing 156 to an integral eye member 159 and then tapers to a reduced diameter end portion that extends through a thrust bearing 160 disposed within a retaining cap 161 mounted on a longitudinal crossmember 162 of platform frame 42. A nut 163 is engaged with the threaded end portion of shaft 155 that extends beyond thrust bearing 160 and beyond a close fitting clearance opening formed in crossmember 162 to maintain the shaft in engagement with the thrust bearing. It will be appreciated that bearing 160 and nut 163 cooperatively prevent axial movement of not only shaft 155, but also crank member 150 and subframe 135.

Idler roller subassembly 36 is adapted to automatically rise upwardly above lateral endless belts 96 when transfer platform 22 is in horizontal position, as shown in FIG. 4, to serve as an auxiliary load-carrying surface to assist in the fore-and-aft movement of unit-load 26, and to retract downwardly below belts 96 when the transfer platform is tilted, as shown in FIG. 5, to avoid interfering with the lateral movement of the unit-load onto and off of the transfer platform. To this end, as most clearly shown in FIG. 8, eye member 159 is secured to the forked end of a female member 164 of a telescoping yoke assembly 165 by a pin 166 extending through aligned cross openings formed in the female member and through a central opening formed in the eye member. A longitudinal blind bore is formed in the end of female member 164 opposite eye member 159 for slidably receiving the adjacent shaft end portion of a male member 168 of yoke assembly 165. The opposite end of male member 168 is constructed in the form of an eye 170 that is pivotally pinned to a pair of spaced-apart, parallel ears 172 of a mounting bracket 174 by a crosspin 176. Mounting bracket 174 has an angle-shaped base portion that is secured to sill 25 of cargo compartment opening 18 by any appropriate means, such as by rivets 177.

Referring specifically to FIGS. 4, 5, and 8, crank members 150 are adapted to rotate back and forth about torque shafts 154 and 155 as transfer platform is pivoted between horizontal and tilted positions, thereby raising and lowering longitudinal, idler roller assembly 36. When platform 22 is disposed in horizontal position, crosspins 176 at the male ends of yoke assemblies 165 are disposed a substantial distance below the rotational center of eye members 159 of torque shafts 155, FIG. 4, so that the yoke assemblies are disposed in diagonal orientation and arms 149 of crank members 150 are in maximum upward orientation. As platform 22 tilts, the elevation of eye members 159 of torque shafts 155 at lowers relative to the elevation of crosspins 176, in FIG. 5, thereby causing the yoke assemblies 165 to assume a more horizontal orientation and arms 149 of crank members 150 to rotate to a lower elevation. As a result, the idler roller assembly 36 is lowered relative to platform frame 42 so that the upper surfaces of idler rollers 134 are now below the upper surface of lateral endless belts 96. It will be appreciated that as platform 22 pivots between horizontal and tilted positions, crank members 150 and side members 136 and 137 of subframe 135 cooperatively function as a four-bar linkage arrangement to automatically raise and lower roller assembly 36 without the need for any external power supply.

Also, as platform 22 pivots, the change in the distance separating crosspins 176 and 166 of yoke assembly 165 is compensated for by the sliding engagement of male yoke member 168 into and out of the blind bore formed in female yoke member 164. Also, as platform 22 pivots up and down, yoke assembly 165 pivots slightly about its longitudinal axis in response to the change in inclination of torque shaft 155. This rotational movement can be accommodated by forming the shaft portion of the male yoke member 168 in a round cross-sectional shape to allow it to rotate within the blind bore of female yoke assembly 162. It will be appreciated that by constructing idler roller assembly 36, including yoke assembly 165, in the manner described above, the changes in the angular orientations and linear distances separating the components of the roller assembly may be accommodated without causing any undue stressing or binding of these components.

As most clearly illustrated in FIGS. 1 through 5, cargo transfer system 10 further includes a longitudinal belt drive in the form of a pair of longitudinal belt conveyors 34 and 35. Conveyor 34 is positioned along the side of transfer platform 22 opposite fuselage opening 18 and conveyor 35 is located along a central portion of the transfer platform. Both conveyors are arranged perpendicularly to lateral belt conveyors 32. Belt conveyor 34 extends along side beam 52 with the ends of the conveyor being bounded by the outwardly extending portions of lateral beams 44 of the platform frame. Conveyor 34 is composed of a pair of elongate, parallel beams, preferably in the form of channel members 178 secured to lower deck 24 by any appropriate means, such as by rivets or weldments, not shown, and extending upwardly to approximately the upper surface of platform frame 42 when the frame is in horizontal position.

Conveyor 34 also includes an endless belt 180 carried by a drive pulley 182 and a tensioning pulley 184 at opposite ends of the belt. As with pulleys 94 and 96 of lateral belt conveyors 32, pulleys 182 and 184 are also crowned, i.e., tapered toward each end of each pulley from the maximum diameter at the center of the pulley, to maintain endless belt 180 centered on the pulleys. Tensioning pulley 184 is antirotationally journaled on tensioning mechanisms, not shown, constructed similarly to mechanisms 104 of conveyors 32, to maintain endless belt 180 in taut condition. Drive pulley 182 is splined to a support shaft, not shown, that in turn is journaled on antifriction bearings, not shown, mounted on the ends of channel members 178 opposite tensioning pulley 184, in a manner well known in the art. Drive pulley 182 is powered by motor 186 connected thereto in torque-transmitting relationship by an appropriate drive means, not shown, also in a manner well known in the art. Motor 186 may be electrically or hydraulically powered or powered by other appropriate means. Longitudinal conveyor 34 further includes a plurality of idler rollers 188 spaced-apart along channel members 178 between the drive and tensioning pulleys. Rollers 188 are antifrictionally mounted on the channel members by a support shaft and antifriction bearings, not shown. To reduce the number of different components comprising the present invention, idler rollers 188 preferably are identical to idler rollers 106 of lateral conveyors 32.

Longitudinal belt conveyor 35 is disposed closely between the longitudinal members 48 and 50 of the platform frame 42 and in parallel alignment with longitudinal belt conveyor 34. Conveyor 35 is constructed with an endless belt 190 powered by a drive pulley 192 in a manner substantially identical to the construction of conveyor 34 with the exception that the drive pulley is powered through a drive shaft 194 rather than by its own motor. Drive shaft 194 interconnects drop gearboxes 196 that support and are drivingly engaged with drive pulleys 182 and 192. Gearboxes 196 enable drive shaft 194 to be located beneath idler rollers 122 so that endless belts 180 and 190 can be driven in unison.

As perhaps most clearly illustrated in FIGS. 1, 2, 4, and 5, when transfer platform 22 is disposed in tilted position, belt conveyors 34 and 35 are disposed below a lateral load-carrying surface defined by the upper flights of belts 96 of conveyors 32 and idler rollers 116A, 116B, 122, and 126 so as not to obstruct the lateral movement of container 26 onto and off of transfer platform 22. However, when the transfer platform is returned to a horizontal orientation, the upper flights of belts 96 and the upper surfaces of idler rollers 116A, 116B, 122 and 126 drop below the upper flights of endless belts 180 and 190, thereby transferring the weight of unit-load 26 from the lateral load-carrying surface onto a longitudinal load-carrying surface defined by belts 180 and 190 and by idler roller assembly 36. Unit-load 26 can then be moved in the longitudinal direction by conveyors 34 and 35 onto an adjacent forward belt drive 38 and idler roller assemblies 39 or an adjacent rearward belt drive 40 and idler roller assemblies 41. As illustrated in FIG. 3, these two belt drives and idler roller assemblies are constructed substantially similar to each other and, thus, only forward belt drive 38 and forward idler roller assemblies 39 will be described with assist in supporting the underside of unit-load 26 as it moves laterally on the transfer platform. Also, when the transfer platform is in tilted position, idler roller assembly 36 and longitudinal belt conveyors 34 and 35 are disposed below the upper flights of endless belts 96 of conveyors 32 thereby avoiding any interference with the underside of unit-load 26.

Transfer platform 22 is next pivoted into an intermediate, tilted position, as shown in solid line in FIG. 2, so that lateral belt conveyors 32 may again be operated to complete the longitudinal movement of unit-load 26 onto the transfer platform, i.e., until the unit-load abutts rail 230. When the transfer platform is disposed in intermediate position, longitudinal conveyors 34 and 35 and longitudinal idler roller assembly 36 are still disposed below the lower surface of unit-load 26.

The platform is thereafter returned to its nominal, horizontal position, shown in phantom line in FIG. 2 and shown in FIG. 4, thereby causing the unit-load to be shifted off of lateral conveyors 32 and idler rollers 116A, 116B, 122 and 126 and onto longitudinal conveyors 34 and 35 and idler roller assembly 36 which now project upwardly above the lateral conveyors and lateral idler rollers. Thereafter, the longitudinal conveyors 34 and 35 may be operated to move unit-load 26 forwardly onto forward belt drive 38 or rearwardly onto rear belt drive 40. The unit-load may be moved further forwardly or rearwardly into cargo hold 12 by operation of additional forward and rearward belt drives, not shown.

To unload unit-load 26, the above-described loading procedure is reversed. It will be appreciated that the powered cargo transfer system 10 of the present invention enables unit-loads, for instance, in the form of containers of lightweight, low strength construction, to be rapidly loaded and unloaded onto an aircraft with a minimum of personnel, and while providing sufficient support for the bottom of the unit-load to prevent puncturing or otherwise damaging the unit-load. Moreover, the cargo transfer system of the present invention may be utilized in conjunction with containers or other types of unit-loads that extend substantially the full height of the cargo hold thereby utilizing as much of the volume of the cargo hold as possible.

As will be apparent to those skilled in the art to which the invention is addressed, the present invention may be embodied in forms other than those specifically disclosed above without departing from the spirit or essential characteristics of the invention. The particular embodiment of the conveying plane described above is therefore to be considered in all respects as illustrative and not restrictive. The scope of the present invention is as set forth in the appended claims rather than being limited to the examples of the conveying plane set forth in the foregoing description.

The embodiments of the invention in which an exclusive property or privilege is claimed are defined as follows:

1. A powered cargo transfer system for an aircraft having a cargo hold and an access opening in the side of the fuselage of the aircraft for moving loads into and out of the cargo hold, said cargo transfer system comprising:
   a. a tiltable conveying plane mounted on the aircraft and positioned adjacent the access opening;
   b. first belt drive means mounted on said conveying plane, said first belt drive means including at least one belt conveyor oriented generally laterally to the length of the fuselage and defining a first load-carrying surface and means on board the aircraft for driving said first belt drive means belt conveyor;
   c. means for tilting said plane laterally relative to the length of the fuselage between a first position wherein the side of the plane adjacent the fuselage opening is tilted downwardly from the horizontal, and a second, generally horizontal position;
   d. second belt drive means positioned adjacent the access opening and oriented generally transversely to said first belt drive means, said second belt drive means including at least one belt conveyor defining a second load-carrying surface retracted beneath adjacent portions of said first load-carrying surface when said plane is in first, tilted position and disposed above said first load-carrying surface when said plane is disposed in second, horizontal position and means on board the aircraft for driving said second belt drive means belt conveyor; and
   e. third belt drive means extending substantially longitudinally along the cargo hold and defining a third load-carrying surface disposed substantially coplanar with said second load-carrying surface.

2. The cargo transfer system according to claim 1, wherein said conveying plane includes first auxiliary conveyor means mounted on said plane in an orientation generally parallel to said first belt drive means, said first auxiliary conveyor means defining a first auxiliary load-carrying surface disposed in substantially coplanar relationship with the first load-carrying surface to assist said first load-carrying surface in supporting and moving loads.

3. The cargo transfer system according to claim 2, wherein said first auxiliary conveyor means is composed of a plurality of spaced-apart rollers and mounting means for antifrictionally mounting said rollers on said plane.

4. A powered cargo transfer system for an aircraft having a cargo hold and an access opening in the side of the fuselage of the aircraft for moving loads into and out of the cargo hold, said cargo transfer system comprising:
   a. a tiltable conveying plane positioned adjacent the access opening;
   b. first belt drive means mounted on said conveying plane, said first belt drive means oriented generally laterally to the length of the fuselage and defining a first load-carrying surface;
   c. means for tilting said plane laterally relative to the length of the fuselage between a first position wherein the side of the plane adjacent the fuselage opening is tilted downwardly from the horizontal, and a second, generally horizontal position;
   d. second belt drive means positioned adjacent the access opening and oriented generally transversely to said first belt drive means, said second belt drive means defining a second load-carrying surface retracted beneath adjacent portions of said first load-carrying surface when said plane is in first, tilted position and disposed above said first load-carrying surface when said plane is disposed in second, horizontal position;
   e. third belt drive means extending substantially longitudinally along the cargo hold and defining a third load-carrying surface disposed substantially coplanar with said second load-carrying surface;

particularity, with it being understood that such description also applies to rearward belt drive 40 and rearward idler roller assemblies 39.

In a preferred form of the present invention, belt drive 38 is composed of a pair of individual belt conveyors 200 and 202 positioned in spaced-apart, parallel relationship to each other on opposite sides of longitudinal belt conveyor 35. Each conveyor is composed of a pair of elongate, laterally spaced-apart channel members 206 secured to lower deck 24 by appropriate means, such as by weldments or fasteners, not shown. As in conveyors 32, 34, and 35, a crowned, generally barrel-shaped drive pulley 208 is positioned between the channel members at one end of the conveyors while a correspondingly shaped tension pulley 210 is positioned between the channel members at the opposite ends of the conveyors. Tensioning pulleys 210 are journaled on tensioning mechanisms 212 by support shafts, not shown, that extend through the hollow interior of the pulleys. The tensioning mechanisms are mounted on the exterior sides of the web portions of channel members 206, where they are readily accessible for convenient adjustment and maintenance.

The drive pulleys 208 are splined on individual support shafts, not shown, that in turn are journaled on bearing assemblies, not shown, fastened to the web portions of channel members 206. The drive pulleys 208 of the conveyors 200 and 202 are simultaneously driven by drive shafts 216 extending outwardly from opposite sides of a gear motor 218 positioned between the two conveyors. Gear motor 218 is secured to lower deck 24 by appropriate means, such as bolts 220, so that the upper surface of the motor is positioned below the upper surfaces of pulleys 208 and 210.

Conveyors 200 and 202 also include an endless belt 221 engaged over corresponding drive and tensioning pulleys 208 and 210. Pulleys 208 and 210 support the upper flights of endless belts 221 at an elevation corresponding to the elevation of the upper flights of endless belts 180 and 190 of longitudinal conveyor 34 and 35 and so that the endless belts 221 cooperatively form a load-carrying surface for moving unit-load 26 forward or rearward along cargo hold 12. A plurality of idler rollers 222 are spaced-apart along channel members 206 between the drive and tensioning pulleys and antifrictionally mounted on the channel members by appropriate means, not shown, to support the upper flight of endless belts 221.

As illustrated in FIG. 3, an auxiliary conveyor in the form of an idler roller assembly 39 extends along the length of both belt conveyors 200 and 202 at locations outwardly of the belt conveyors to support the laterally outward portions of unit-load 26. As shown in FIG. 9, each idler roller assembly 39 includes a pair of generally channel shaped support structures 225 having upwardly extending web portions for supporting the ends of shafts 226 on which individual, elongate rollers 227 are mounted through the use of antifriction bearings 228. Rollers 227 are mounted on support structures 225 so that their upper surfaces define an auxiliary load carrying surface that is coplanar with the load-carrying surface defined by endless belts 221 of conveyors 200 and 202.

Although only one forward belt drive 38 and only one rearward belt drive 40 is illustrated in FIG. 3, ideally, additional forward and rear belt drives, not shown, are positioned along the length of the cargo hold to sequentially move unit-load 26 through the hold. Preferably, each forward and rearward belt drive is constructed in a length corresponding to the longitudinal dimension of unit-load 26 so that the unit-loads are substantially uniformly supported by the individual belt drives. Also, ideally, idler roller assemblies 224 are constructed as a continuous unit extending along the entire combined lengths of the forward and rearward belt drives rather than being constructed in individual sections corresponding to the length of each separate forward or rearward belt drive.

Next, referring specifically to FIG. 3, an elongate guide rail 230 is supported along the side of transfer platform 22 opposite cargo hold opening 18 at an elevation above longitudinal belt conveyors 34 and 35 by a pair of angle-shaped support arms 232 extending outwardly and upwardly from the adjacent the ends of beams 44. A nose cap 234 is secured to each end of guide rail 230. Nose caps 234 are rounded to avoid hooking, or otherwise damaging unit-load 26 as it moves longitudinally along the cargo hold. It will be appreciated that rail 230 not only guides unit-load 26 for longitudinal movement, but also serves as a stop to bear against the unit-load during loading operations. To avoid excess weight, preferably rail 230 is constructed from hollow tube or channel material orientated to present a vertical face toward unit-load 26.

Continuing to refer principally to FIG. 3, additional guide rails 236 and 238 extend forwardly and rearwardly of rail 230 to form extensions thereof. Rails 236 and 238 are supported by a plurality of spaced-apart support arms 240 secured at their lower ends to deck 24. The support arms extend upwardly from the deck and then a short distance transversely inwardly toward the center of the cargo hold to extend between the upper and lower flanges of the generally channel-shaped guide rails 236 and 238. Support arms 240 can be secured to the guide rail by any appropriate means. Preferably, the guide rails 236 and 238 extend forwardly and rearwardly along substantially the entire lengths of the forward and rearward sections of the cargo hold at a constant elevation above corresponding forward and rearward belt drives 38 and 40. Also, ideally, guide rails 236 and 238 are continuous along their lengths to avoid catching on unit-load 26 as it moves along the cargo hold. Although not illustrated, it is to be understood that guide rails similar to guide rails 236 and 238 are disposed on the right-hand side of the cargo hold, as illustrated in FIG. 3, and are constructed and supported in substantially the same manner as the illustrated guide rails.

It is to be understood that guide rails 236 and 238 can be constructed in other forms or replaced by other structures without departing from the spirit or scope of the present invention. For instance, the rails and their supporting arms 240 can be replaced with a formed sheet metal panel that extends upwardly from deck 24 at a location corresponding to the face of the rails and then horizontally outwardly to join the fuselage structure.

To utilize the present invention to load cargo, such as unit-load 26, onto an aircraft, transfer platform 22 is initially pivoted into tilted position, as shown in FIGS. 1 and 5. When in tilted position, transfer platform 22 receives unit-load 26 from a correspondingly inclined belt-type ground loader 30. Lateral belt conveyors 32 are operated to move the container laterally onto the transfer platform until the upper forward corner of the unit-load approaches the roof of cargo hold 12. As described above, idler rollers 116A, 116B, 122 and 126 f. second auxiliary conveyor means mounted on said plane in an orientation generally parallel to said second belt drive means, said second auxiliary conveyor means defining a second auxiliary load-carrying surface; and g. means for raising and lowering said second auxiliary conveyor means to position the second auxiliary load-carrying surface below the first load-carrying surface when said plane is in first, tilted position, and above the first load-carrying surface in substantial coplanar relationship with the second load-carrying surface when said plane is in second, horizontal position.

5. The cargo transfer system according to claim 4, wherein said second auxiliary conveyor means comprising:
   a. a subframe;
   b. a plurality of rollers; and
   c. means for antifrictionally mounting said rollers on said subframe.

6. The cargo transfer system according to claim 4, wherein said raising and lowering means is automatically actuated by the tilting movement of said plane.

7. The cargo transfer system according to claim 4, wherein said first belt drive means is composed of at least two spaced-apart, parallel belt conveyors, and said second auxiliary conveyor means is disposed between said pair of belt conveyors.

8. The cargo transfer system according to claim 1, wherein said tilting means includes means for pivoting said conveying plane about a pivot axis extending longitudinally of the fuselage.

9. The cargo transfer system according to claim 8, wherein the pivot axis of said plane is offset from the center of the plane toward the cargo hold opening to bias said plane to tend to automatically pivot to its second, horizontal position when a load is uniformly placed on said plane.

10. The cargo transfer system according to claim 1, further comprising abutment and guide means disposed along the portion of said plane opposite the cargo hold opening to act as a stop for a load entering the cargo hold on said first load-carrying surface and guide the load for movement on said second load-carrying surface.

11. The cargo transfer system according to claim 1, wherein said second belt conveyor means is located within the perimeter of said plane.

12. The cargo transfer system according to claim 11, wherein said second belt drive means is secured to the fuselage and extends upwardly through said plane when said plane is in second position.

13. The cargo transfer system according to claim 1, wherein said second belt drive means is mounted on the fuselage to maintain the elevation of said second load-carrying surface stationary relative to the fuselage.

14. The cargo transfer system according to claim 1, wherein said third belt drive means is composed of a series of individual belt conveyor assemblies disposed in end-to-end adjacent relationship along the length of the cargo hold.

15. The cargo transfer system according to claim 14, wherein each of said belt conveyor assemblies is composed of a plurality of parallel, spaced-apart endless belt subassemblies and means for in-unison powering said endless belt subassemblies.

16. The cargo transfer system according to claim 14, further including third auxiliary conveyor means extending along the cargo hold to define a third auxiliary load-carrying surface to assist said third load-carrying surface in supporting and moving loads.

17. The cargo transfer system according to claim 1, further comprising third auxiliary conveyor means extending along the cargo hold to define a third auxiliary load-carrying surface to assist said third load-carrying surface in supporting and moving loads.

18. A powered station for loading and unloading cargo through an opening in the side of a cargo hold in a direction generally transverse to the length of the hold and moving the cargo longitudinally along the hold, comprising:
   a. a tiltable conveying plane disposed within the cargo hold at the hold opening, said conveying plane having first belt drive means to operate in a direction generally transverse to the length of the cargo hold, said first belt drive means defining a first load-carrying surface;
   b. second belt drive means disposed longitudinally along the floor of the hold at the hold opening and located at least partially within the perimeter of said conveying plane, said second belt drive means defining a second load-carrying surface;
   c. means for pivoting said conveying plane about a pivot axis disposed longitudinally of the cargo hold between a first position wherein the first and second load-carrying surfaces are substantially parallel with each other and the second load-carrying surface being disposed above the first load-carrying surface, and a second position wherein the side of said conveying plane adjacent the hold opening is tilted downwardly to askew the first and second load-carrying surfaces relative to each other, with the second load-carrying surface being disposed below the adjacent portions of the first load-carrying surface;
   d. auxiliary conveyor means associated with said conveying plane and disposed in an orientation parallel with said second belt drive means, said auxiliary conveyor means defining an auxiliary load-carrying surface; and
   e. means for automatically raising and lowering said auxiliary conveyor means relative to said conveying plane as said conveying frame is pivoted between first and second positions to raise the auxiliary load-carrying surface above the first load-carrying surface into substantially coplanar relation with the second load-carrying surface when said conveying plane is in first position and to lower the auxiliary load-carrying surface as said conveying plane is tilted into second position to a level below said first load-carrying surface.

19. The powered station according to claim 18, wherein said means for automatically raising and lowering said auxiliary conveyor means relative to said conveying plane includes linkage means actuated by the tilting of said conveying plane.

20. The powered station according to claim 18, wherein said auxiliary conveyor means and said means for automatically raising and lowering said auxiliary conveyor means cooperatively define four-bar linkage means actuated by the tilting of said conveying plane.

21. The powered station according to claim 18, wherein the pivot axis of said conveying plane is offset from the center of said conveying plane toward the cargo opening to cause said conveying plane to tend to automatically pivot in to its first position when a load is generally uniformly placed on said conveying plane.

22. The powered station according to claim 18, further comprising abutment and guide means disposed along the side of said conveying plane opposite the cargo opening to stop the inward movement of a load carried by said first belt drive means and guide the load for movement longitudinally along said conveying plane on said second belt drive means.

23. The powered station according to claim 18, wherein said conveying plane further comprising second auxiliary conveyor means:
 a. defining a second auxiliary load-carrying surface disposed in substantial coplanar relationship with said first load-carrying surface; and
 b. oriented to support loads for movement parallel to the direction of movement of said first load-carrying surface.

* * * * *